United States Patent
Li et al.

(10) Patent No.: US 6,660,639 B2
(45) Date of Patent: Dec. 9, 2003

(54) METHOD OF FABRICATING A COPPER DAMASCENE STRUCTURE

(75) Inventors: Yuzhuo Li, Potsdam, NY (US); Jason Keleher, Schenectady, NY (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 10/266,169

(22) Filed: Oct. 7, 2002

(65) Prior Publication Data

US 2003/0098434 A1 May 29, 2003

Related U.S. Application Data

(62) Division of application No. 09/692,729, filed on Oct. 19, 2000, now Pat. No. 6,508,953.

(51) Int. Cl.$^7$ .............................................. H01L 21/302
(52) U.S. Cl. ...................................... 438/692; 438/693
(58) Field of Search ................................. 438/689, 690, 438/691, 692, 693; 252/79.1–79.5

(56) References Cited

U.S. PATENT DOCUMENTS

| | | | |
|---|---|---|---|
| 5,897,375 A | * | 4/1999 | Watts et al. ................. 438/693 |
| 5,981,454 A | | 11/1999 | Small |
| 6,242,351 B1 | * | 6/2001 | Li et al. ...................... 438/690 |
| 6,503,418 B2 | * | 1/2003 | Sahota et al. ............... 252/79.1 |

* cited by examiner

Primary Examiner—Kin-Chan Chen
(74) Attorney, Agent, or Firm—Rankin, Hill, Porter & Clark LLP

(57) ABSTRACT

The present invention provides a method of removing copper overlaying a tantalum-based barrier layer during the fabrication of a copper damascene structure having a plurality of copper lines. The method includes providing a chemical-mechanical polishing slurry and polishing the copper layer using the slurry until the tantalum-based barrier layer is exposed. The slurry includes an oxidizing agent that releases free radicals and a non-chelating free radical quencher that retards the corrosion of said copper lines during chemical mechanical polishing. Preferred non-chelating free radical quenchers are ascorbic acid, thiamine, 2-propanol, and alkyl glycols. The present invention also provides copper damascene structures formed according to the method.

19 Claims, No Drawings

METHOD OF FABRICATING A COPPER DAMASCENE STRUCTURE

This is a division of application Ser. No. 09/692,729 filed Oct. 19, 2000, now U.S. Pat. No. 6,508,953.

FIELD OF INVENTION

The present invention relates to a slurry for chemical-mechanical polishing copper damascene structures, and more particularly, to a slurry that retards copper line corrosion during the chemical-mechanical polishing of copper overlaying a tantalum-based barrier layer during the fabrication of copper damascene structures.

BACKGROUND OF THE INVENTION

Integrated circuits are made up of millions of active devices formed in or on a substrate such as silicon or gallium arsenide. The active devices are typically isolated from each other using silicon-based dielectric materials. The active devices are usually formed in multiple layers that are interconnected to form functional circuits and components. Interconnection of active devices is typically accomplished through the use of well-known multilevel interconnection processes such as the process disclosed in Chow et al., U.S. Pat. No. 4,789,648.

Copper is a highly preferred electrically conductive material for use in fabricating integrated circuits because it has superior electromigration resistance and lower resistivity than many other electrically conductive materials such as aluminum. Copper wiring and interconnects allow for the use of higher critical current in integrated circuits, which can greatly improve the performance capabilities of such devices.

The use of copper in integrated circuits, however, does present some difficult challenges. Copper readily diffuses into conventional silicon-based dielectric materials such as polysilicon, single-crystalline silicon, silicon dioxide, low-k inorganic and organic materials, and the like. Once these silicon-based materials have been contaminated with copper atoms, the dielectric constant of the silicon-based dielectrics is adversely affected. In addition, once semiconductive silicon-based materials are copper doped, transistors made within or in close proximity to the copper doped silicon-based regions either cease to function properly or are significantly degraded in electrical performance. Therefore, a barrier layer or liner film must be applied to the silicon-based dielectric layer in order to prevent copper diffusion.

One of the presently preferred methods of fabricating integrated circuits having copper wiring and interconnects, which are also known as copper damascene structures, generally comprises providing interconnected copper wiring or metallization patterns in discrete layers of dielectric film. The materials typically used to form these dielectric film layers include phosphosilicate glass, borophosphosilicate glass, and silicon dioxide. The dielectric layer is etched or otherwise processed to pattern a series of trenches and/or holes therein. A thin barrier layer or liner film, generally not more than approximately 300 Å thick is then deposited over the patterned dielectric layer. Preferred barrier layers or liner films comprise thin films of tantalum (Ta) or tantalum nitride (TaN) or both Ta and TaN disposed over one another to form a Ta/TaN stack. Such liners are commonly deposited by physical vapor deposition, which is also known as sputter deposition, or they may be deposited by a chemical vapor deposition to form a more conformed coating. The Ta and/or TaN liner coats the surfaces of the trenches and holes as well as the upper surface of the dielectric layer to prevent copper atom diffusion and also to provide good adhesion between the copper layer and the dielectric layer. A layer of copper approximately 3,000–15,000 Å thick is then deposited over the liner layer so as to completely fill the trenches and/or holes. The filled trenches thus form a network of copper lines whereas the filled holes form vias or interconnects. The final step in the process of fabricating an integrated circuit, which is also known as the copper damascene process, is removing the copper layer and tantalum-based barrier layer from the upper surface of the dielectric film layer leaving only the copper filled trenches and holes. This is typically accomplished by chemical-mechanical polishing.

In a typical chemical-mechanical polishing process, the metallized surface of the copper damascene structure is placed in direct contact with a rotating polishing pad at a controlled downward pressure. A chemically reactive solution commonly referred to as a "slurry" is present between the pad and the surface of the copper damascene structure during polishing. The slurry initiates the polishing process by chemically reacting with the surface of the metal film being polished. The polishing process is facilitated by the rotational movement of the pad relative to the substrate and the presence of the slurry at the film/pad interface. Polishing is continued in this manner until the desired film or films are removed.

The composition of the slurry is an important factor in determining the rate at which metal film layers are removed by chemical-mechanical polishing. If the chemical agents in the slurry are selected properly, the slurry can be tailored to provide effective polishing of specific film layers at desired polishing rates while minimizing the formation or creation of surface imperfections or defects. In some circumstances, the polishing slurry can preferably provide controlled polishing selectivities for one or more thin film materials relative to other thin-film materials.

Prior art chemical-mechanical polishing slurries used to remove copper overlaying tantalum-based barrier layers have exhibited a high selectivity for copper as compared to the tantalum-based materials. This advantageously permits the rapid removal of the copper layer overlaying the tantalum-based barrier layer. However, the aggressive chemical action of these prior art polishing slurries disadvantageously tends to corrode the copper lines of the copper damascene structure during polishing, resulting in failure of the active devices or inconsistency in their performance.

A need exists for an improved chemical-mechanical polishing slurry for use in removing copper overlaying a tantalum-based barrier layer during the fabrication of a copper damascene structure. Such an improved chemical-mechanical polishing slurry would preferably remove copper overlaying tantalum-based barrier layers at a high enough rate to insure acceptable throughput while at the same time retarding the corrosion of copper lines.

SUMMARY OF INVENTION

The present invention provides a slurry for chemical-mechanical polishing copper damascene structures, and more particularly, to a slurry that retards copper line corrosion during the chemical-mechanical polishing of copper overlaying a tantalum-based barrier layer during the fabrication of copper damascene structures. The slurry according to the invention comprises an oxidizing agent that releases free radicals and a non-chelating free radical quencher that is effective to retard the corrosion of said copper lines during chemical-mechanical polishing. The oxidizing agents that release free radicals used in the slurry according to the invention are preferably selected from the group consisting of peroxides, peroxydiphosphates, and persulfates. The non-chelating free radical quenchers used in the slurry according to the invention are preferably selected from the group consisting of ascorbic acid, thiamine, 2-propanol, and alkyl glycols, with ascorbic acid being most preferred. The non-chelating free radical quenchers in the chemical-mechanical polishing slurry according to the invention surprisingly retard copper line corrosion during the polishing of copper damascene structures without reducing the copper polishing rate to unacceptable levels. The anti-corrosion effect is independent of pH, but when the pH of the slurry is adjusted to from about 4.0 to about 7.0, the removal rate of copper is maximized.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

In co-pending application Ser. No. 09/277,454, the specification of which is hereby incorporated by reference, it was disclosed that the generation of relatively large concentrations of free radicals can substantially increase the rate of copper removal during chemical-mechanical polishing. An undesirable side-effect of the presence of relatively large concentrations of free radicals during chemical-mechanical polishing is copper line corrosion.

The term "corrosion" as used in the specification and in the appended claims is intended to refer to the phenomenon wherein usually irregular-shaped pits or depressions are chemically etched into the copper lying in the trench or hole during the chemical-mechanical polishing of copper damascene structures. As used in the specification and in the appended claims, the term "corrosion" is not intended to refer to the usually shallow depressions in the copper lying in the trench or hole that can occur due to the chemical-mechanical action of the polishing pad, which is commonly known as "dishing."

It is well-known in the art that benzotriazole (BTA) and compounds having similar functionality can be added to chemical-mechanical polishing slurries to protect copper lines from corrosion. As explained in Sasaki et al., U.S. Pat. No. 5,770,095, copper reacts with BTA to form a secure film comprising a copper chelate compound or complex. The copper chelate film serves as a protective barrier film to prevent oxidization or corrosion of the underlying copper film by the chemical agents in the slurry. Unfortunately, when a small amount of BTA is used, it is very difficult to control the consistency of the slurry performance. And, when a larger amount of BTA is used, the copper removal rate is decreased to an unacceptably low level.

The present invention provides a chemical-mechanical polishing slurry that can protect copper lines from corrosion without the need for BTA or other chelates. Applicants have surprisingly found that copper line corrosion can be effectively suppressed by incorporating a non-chelating free radical quencher in a chemical-mechanical polishing slurry without reducing the copper polishing rate to unacceptable levels. Accordingly, the slurry according to the invention comprises an oxidizing agent that releases free radicals and a non-chelating free radical quencher that is effective to retard the corrosion of said copper lines during chemical-mechanical polishing.

The oxidizing agent used in the slurry according to the present invention releases free radicals during polishing. Suitable oxidizing agents for use in the invention include, for example, peroxides, peroxydiphosphates, persulfates, and combinations of the foregoing. Presently, the most preferred oxidizing agents for use in the slurry according to the invention are hydrogen peroxide, ammonium persulfate, and/or potassium persulfate. The oxidizing agent preferably comprises from about 0.01 % to about 15.0% by weight of the slurry. More preferably, the oxidizing agent comprises from about 0.1% to about 10.0% by weight of the slurry. When hydrogen peroxide is used, the oxidizing agent optimally comprises from about 0.5% to about 5.0% by weight of the slurry.

The slurry according to the present invention also comprises at least one non-chelating free radical quencher. As used in the specification and in the appended claims, the term "non-chelating free radical quencher" is intended to refer to a compound that does not readily chelate or otherwise complex with copper, but that is capable of reacting with a free radical species to retard its reactivity and thus protect the copper metal from corrosion. The presently most preferred non-chelating free radical quencher for use in the slurry according to the invention is ascorbic acid, which is also known as Vitamin C. Other preferred non-chelating free radical quenchers include thiamine (3-[(4-amino-2-methyl-5-pyrimidinyl)methyl]-5-(2-hydroxyethyl)-4-methylthiazolium chloride), which is also known as Vitamin $B_1$, 2-propanol, and alkyl glycols. It will be appreciated that derivatives and precursors of these non-chelating free radical quenchers can also be used in the invention, and that the appended claims should be read with sufficient breadth to encompass such derivatives and precursors.

The preferred amount of non-chelating free radical quencher used in the slurry is the smallest amount that is effective to retard the corrosion of said copper lines during chemical-mechanical polishing. Typically, the non-chelating free radical quencher will comprise from about 0.01% to about 5.0% by weight of the slurry. When ascorbic acid is used as the non-chelating free radical quencher, an amount from about 0.1% to about 1.0% by weight of the slurry is usually effective in retarding the corrosion of copper lines.

Optionally, the slurry according to the present invention can further comprise abrasive particles. However, it will be appreciated that for some applications it may be preferable for the slurry not to contain abrasive particles. In such circumstances, the mechanical polishing action is provided by the pressure of the polishing pad. When present, abrasive particles further assist in performing the function of mechanical grinding.

Abrasive particles that may be used in the slurry according to the present invention may comprise any one or a mixture of a variety of abrasive particles that are conventionally utilized in chemical-mechanical polishing slurries. Examples of suitable abrasive particles include alumina, ceria, copper oxide, diamond, iron oxide, nickel oxide, manganese oxide, silica, silicon carbide, silicon nitride, tin oxide, titania, titanium carbide, tungsten oxide, yttria, and zirconia, and combinations thereof. Presently, the preferred abrasives are silica, alumina, and ceria, with alumina and silica being most preferred.

The abrasive particles preferably have a mean size ranging from about 0.02 to about 1.0 micrometers, with a maximum size of less than about 10 micrometers. It will be appreciated that while particle size is not per se critical, if the abrasive particles are too small, then the polishing rate of the slurry can be unacceptably low. It will also be appreciated that if, on the other hand, the particles are too large, then unacceptable scratching can occur on the surface of the article being polished. The abrasive particles can be present in the slurry in an amount up to about 60% by weight of the slurry, more preferably from about 0.5% to about 30.0% by weight of the slurry, and optimally within the range of from about 3.0% to about 10.0% by weight of the slurry.

Preferably, the slurry according to the invention further comprises a solvent. The preferred solvent for use in the slurry according to the invention is deionized water. Other solvents conventionally used in chemical-mechanical polishing slurries can also be used. The slurry may also contain optional surfactants, pH adjusters, pH buffers, anti-foaming agents, and dispersing agents, which are well known.

The anti-corrosion effect produced by incorporating a non-chelating free radical quencher in the slurry according to the invention is not pH dependent. In other words, the corrosion retardant phenomenon is observed throughout a broad range of pH. However, when the pH of the slurry is adjusted to from about 4.0 to about 7.0, the rate of desired copper removal is optimal. Preferably, the pH of the slurry is adjusted by the addition of nitric acid, potassium hydroxide, and/or ammonium hydroxide.

Preferably, the slurry according to the present invention is prepared by dispersing the oxidizing agent in the solvent either before or after the non-chelating free radical quencher has been added. If abrasive particles are to be included in the slurry, the slurry can be prepared in a number of ways. For example, the slurry may be prepared by dispersing the abrasive particles in a solvent either before or after the oxidizing agent and/or the non-chelating free radical quencher have been added. The slurry may also be prepared as a two-component system (i.e., an abrasive dispersed in deionized water component and an oxidizing agent and non-chelating free radical quencher in deionized water component). The slurry may also be prepared in concentrated form needing only the addition of deionized water to dilute the concentrate (or concentrated components in a two-component system) to the desired level.

Alternatively, the slurry according to the present invention may be formed by incorporating a portion of the components of the slurry in a polishing pad. For example, the abrasive particles and the non-chelating free radical quencher could be incorporated directly in the polishing pad, either with or without abrasive particles, and deionized water and the oxidizing agent could then be added to the pad or the surface of the article being polished to form the polishing slurry in situ. In another alternative embodiment, the abrasive particles could be bonded to the polishing pad, and the oxidizing agent, non-chelating free radical quencher and deionized water could be added either separately or together to the pad or the surface of the article being polished to form the polishing slurry in situ. It will be appreciated that the components of the slurry according to the invention could be combined in various ways to form the slurry in situ.

It is also possible to form the components of the slurry by combining chemical precursors together either before or at the time of polishing. Thus, as used in the specification and in the appended claims, the term "slurry" should be understood to refer to the components present at the interface between the polishing pad and the surface of the article being polished during chemical-mechanical polishing, and, unless otherwise stated, use of the term "slurry" is intended to encompass situations where precursors are combined to form the components of the slurry in situ.

The present invention is also directed to a method of removing copper overlaying a tantalum-based barrier layer during the fabrication of a copper damascene structure having a plurality of copper lines. The method according to the invention comprises providing a chemical-mechanical polishing slurry comprising an oxidizing agent that releases free radicals and a non-chelating free radical quencher that is effective to retard the corrosion of said copper lines during chemical-mechanical polishing, and polishing the copper layer using the slurry until the tantalum-based barrier layer is exposed.

The following examples are intended only to illustrate the invention and should not be construed as imposing limitations upon the claims.

EXAMPLE

Slurry A was formed by dispersing 3.0% by weight alumina particles having an average particle diameter of 340 nm, 3.0% by weight hydrogen peroxide, and 1.0% by weight glycine in deionized water. Slurry B was formed in the same manner and had the same composition as Slurry A, except that it also contained 1.0% by weight ascorbic acid. A sufficient amount of potassium hydroxide was then added to each slurry to adjust the pH to 5.8.

Identical Sematech 926 patterned wafers (each wafer comprised a silicon substrate having an etched TEOS CVD silicon-dioxide dielectric layer 3000 nm, a 25 nm Ta/TaN barrier layer, and 1600 nm copper layer sequentially applied thereto) was separately polished with Slurries A and B described above using a Strasbaugh 6CA polisher and a Rodel IC1400 K-grooved pad. The polishing conditions were: 4 psi down pressure; 0 psi back pressure; 40 rpm table speed; 40 rpm quill speed; 20° C. temperature; and 200 cc/min slurry flow rate.

After the copper layer was removed to expose the Ta/TaN barrier layer by chemical-mechanical polishing, the surface of each wafer was examined using an optical microscope for copper line corrosion. The wafer polished using Slurry A showed severe copper line corrosion whereas the wafer polished using Slurry B, which contained a non-chelating free radical quencher (i.e., 1.0% by weight ascorbic acid), showed no visible corrosion. The results of the foregoing Example are summarized in Table I below:

TABLE I

| Slurry | Oxidizing Agent | Abrasive | Agent for Quenching Radicals | Other Additives | Cu Polishing Rate | Cu Line Corrosion |
|---|---|---|---|---|---|---|
| A | 1% $H_2O_2$ | 3% $Al_2O_3$ | NONE | 1% glycine | 900 nm/min | Severe |
| B | 1% $H_2O_2$ | 3% $Al_2O_3$ | 1% ascorbic acid | 1% glycine | 620 nm/min | NONE |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A method of removing copper overlaying a tantalum-based barrier layer during the fabrication of a copper damascene structure having a plurality of copper lines, said method comprising:
   providing a chemical-mechanical polishing slurry comprising:
   an oxidizing agent that releases free radicals; and
   a non-chelating free radical quencher that retards the corrosion of said copper lines during chemical mechanical polishing selected from the group consisting of thiamine, 2-propanol, alkyl glycols, and combinations of the foregoing; and
   polishing said copper layer using said slurry until said tantalum-based barrier layer is exposed.

2. The method according to claim 1 wherein said oxidizing agent that releases free radicals is selected from the group consisting of peroxides, peroxydiphosphates, persulfates, and combinations of the foregoing.

3. The method according to claim 1 wherein said slurry has a pH of from about 4.0 to about 7.0.

4. The method according to claim 1 wherein said slurry further comprises abrasive particles.

5. The method according to claim 4 wherein said abrasive particles are selected from the group consisting of silica, aluminum, ceria, and combinations of the foregoing.

6. The method according to claim 4 wherein said abrasive particles comprise from about 0.1% to about 60.0% of said slurry by weight.

7. A method of removing copper overlaying a tantalum-based barrier layer during the fabrication of a copper damascene structure having a plurality of copper lines, said method comprising:
   providing a chemical-mechanical polishing slurry comprising:
   hydrogen peroxide; and
   a non-chelating free radical quencher that retards the corrosion of said copper lines during chemical mechanical polishing selected from the group consisting of ascorbic acid, thiamine, 2-propanol, alkyl glycols, and combinations of the foregoing; and
   polishing said copper layer using said slurry until said tantalum-based barrier layer is exposed.

8. The method according to claim 7 wherein said non-chelating free radical quencher comprises from about 0.01% to about 5.0% of said slurry by weight.

9. The method according to claim 7 wherein said hydrogen peroxide comprises from about 0.01% to about 15.0% of said slurry by weight.

10. The method according to claim 7 wherein said slurry further comprises abrasive particles.

11. The method according to claim 10 wherein said abrasive particles are selected from the group consisting of silica, alumina, ceria, and combinations of the foregoing.

12. The method according to claim 10 wherein said abrasive particles comprise from about 0.1% to about 60.0% of said slurry by weight.

13. The method according to claim 7 wherein said slurry further comprises deionized water.

14. The method according to claim 7 wherein said slurry further comprises pH adjusters and/or pH buffers.

15. The method according to claim 14 wherein the pH of the slurry has been adjusted to less than about 7.0.

16. A method of removing copper overlaying a tantalum-based barrier layer during the fabrication of a copper damascene structure having a plurality of copper lines, said method comprising:
   providing a chemical-mechanical polishing slurry comprising:
   from about 3% to about 10% by weight of abrasive particles;
   from about 0.5% to about 5.0% by weight of hydrogen peroxide; and
   from about 0.1% to about 1% by weight of ascorbic acid; and
   polishing said copper layer using said slurry until said tantalum-based barrier layer is exposed.

17. The method according to claim 16 wherein said abrasive particles comprise alumina.

18. The method according to claim 17 wherein said slurry further comprises deionized water and glycine.

19. The method according to claim 18 wherein the pH of said slurry is within the range of from about 4.0 to about 7.0.

* * * * *